June 14, 1955  W. BRAUN  2,710,568
PHOTOGRAPHIC OBJECTIVE SHUTTER WITH BUILT-IN SYNCHRONIZER
Filed June 24, 1952  3 Sheets-Sheet 2
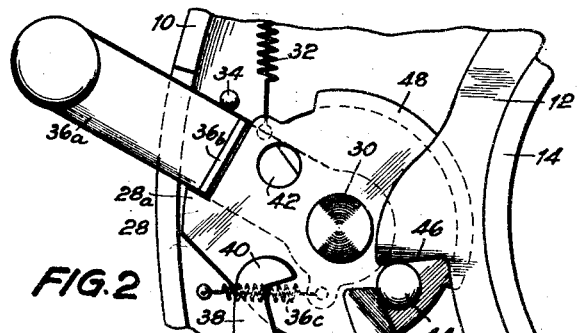
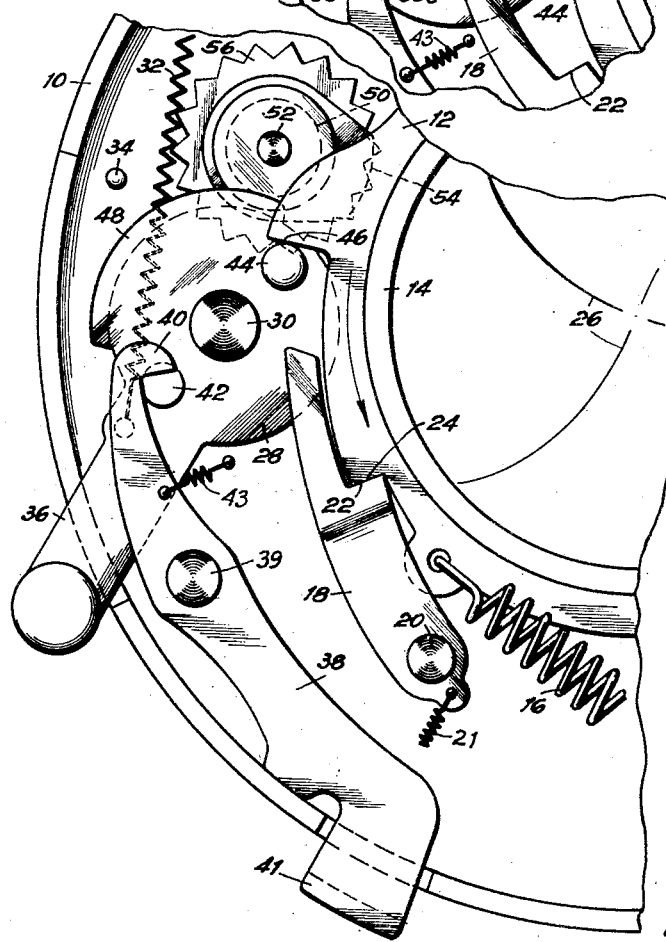
INVENTOR
Wilhelm Braun
By Charles Shepard
Attorney

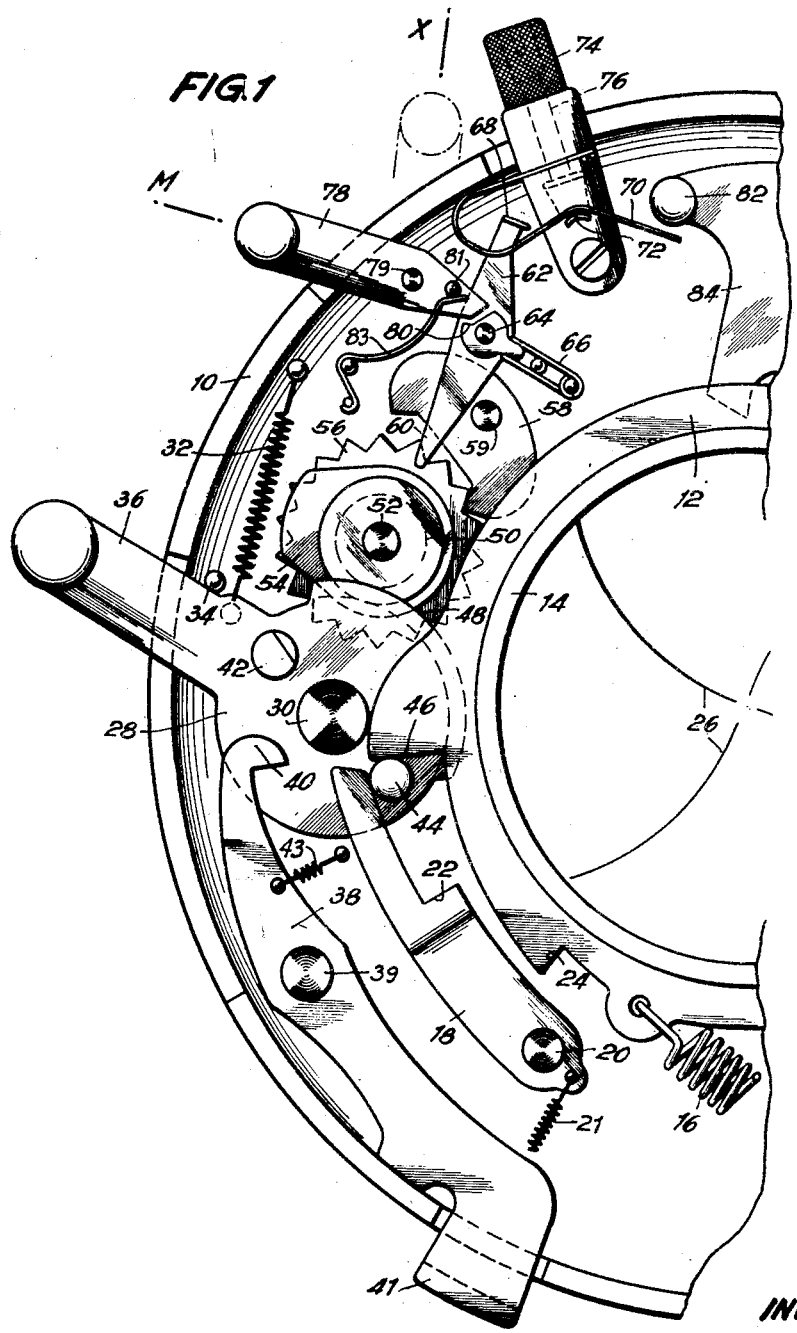

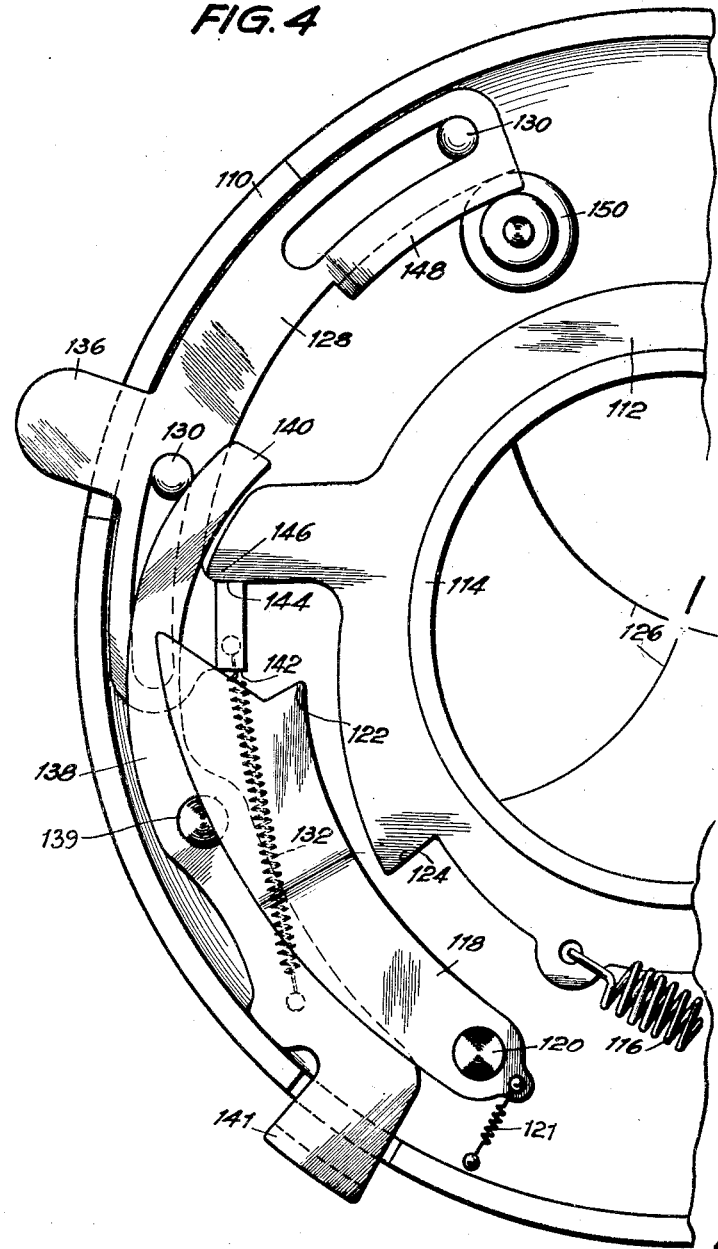

United States Patent Office 2,710,568
Patented June 14, 1955

---

2,710,568

PHOTOGRAPHIC OBJECTIVE SHUTTER WITH BUILT-IN SYNCHRONIZER

Wilhelm Braun, Munich, Germany, assignor to Hans Deckel, Munich-Solln, Germany, and Friedrich Wilhelm Deckel, Garatshausen, Post Tutzing, Germany Application June 24, 1952, Serial No. 295,206

Claims priority, application Germany July 20, 1951

11 Claims. (Cl. 95—11.5)

This invention relates to a photographic shutter (especially a shutter of the kind known as an objective shutter or a lens shutter, as distinguished from a curtain shutter or focal plane shutter) with a built-in flashlight synchronizer driven from its own independent source of power. An object of the invention is the provision of a generally improved and more satisfactory shutter of this kind.

In certain prior shutters of this same general type, the travel of the synchronizing member under the influence of its driving spring has been subjected, during all or most of its range of movement, to the frictional resistance of moving the main shutter locking member or latch to its released position. The frictional resistance to movement of the main shutter latch has not only been severe, but also has been quite variable as a result of continued wear on the latching parts. This has caused irregularities and unsatisfactory operation in the timing movement of the synchronizer parts. It is, accordingly, one of the principal objects of the present invention to produce a structure in which the movement of the synchronizer is not subject to the frictional resistance of the main shutter latch except during a very small part of the movement of the synchronizer, thus minimizing the influence of the latch friction on the true and accurate running of the synchronizer.

Still another object is the provision of an improved synchronizer structure having the advantages above mentioned, and also being so designed that it may be built into an existing type of shutter with a relatively small amount of redesign of the shutter parts and retooling of the tools for making them.

These and other desirable objects may be attained in the manner disclosed as an illustrative embodiment of the invention in the following description and in the accompanying drawings forming a part hereof, in which:

Fig. 1 is a fragmentary front view of a shutter in accordance with a preferred embodiment of the present invention, with parts broken away, and with the front plate or cover plate removed to show certain parts beneath, the shutter being shown in its rundown position at the conclusion of making an exposure;

Fig. 2 is a view similar to a portion of Fig. 1, showing the parts in the set or tensioned position, ready for making an exposure;

Fig. 3 is a fragmentary view illustrating a modification of the structure shown in Figs. 1 and 2; and Fig. 4 is a view similar to Fig. 1, showing another modification or alternative construction.

The same reference numerals throughout the several views indicate the same parts.

In all figures of the drawings, there are illustrated only those parts of the mechanism which are necessary to an understanding of the present invention by one already familiar with the construction of shutters of this general type, most of the conventional shutter parts being omitted from the illustration. The synchronizer mechanism of the present invention is here shown as being applied to a shutter of the well known type available commercially on the market under the trade-mark "Compur," the principal operating parts of which are disclosed, for example, in United States Patent 1,687,123, granted October 9, 1928, for an invention of Friedrich Deckel, et al.

Referring now to the construction disclosed in Figs. 1 and 2, this comprises a shutter housing or casing of the usual annular form, having an outer flange or wall 10, the casing containing a ring shaped master member 12 mounted to turn on the inner wall or lens tube 14 of the casing. The master spring or main driving spring of the shutter is shown at 16. A locking pawl or latching member 18 is pivoted within the casing 10 at 20, and is influenced by a spring 21 to tend to turn the pawl in a clockwise direction on its pivot, so that a latching shoulder 22 on the pawl may engage with an abutment or shoulder 24 on the master member 12, when the latter is turned in a clockwise direction on the tube 14, against the force of the spring 16. When the master member has been set or tensioned and latched in its set position, it is in the position illustrated in Fig. 2. If the latch 18 is now moved to disengage or release the shoulder 22 from the abutment 24, the spring 16 will turn the master member 12 in the counterclockwise direction indicated by the arrow in Fig. 2, and this movement of the master member will, in known manner, open and then close the shutter blades indicated diagrammatically at 26.

The shutter casing 10 contains the flashlight synchronizing mechanism, including the main synchronizer part or element 28 mounted to turn on a pivot 30 and influenced by a spring 32 which constantly tends to turn the element 28 in a clockwise direction on its pivot, until it comes against a stop 34. The synchronizer 28 has an arm 36 projecting out of the casing 10 through a slot, to an accessible position where the arm 36 may be manually actuated to move it from the rest position or rundown position shown in Fig. 1, to the set or tensioned position shown in Fig. 2. When it is moved to this tensioned position, the synchronizer is held in such position by a rocker arm or lever 38 pivoted intermediate its ends on the pivot 39 and having at one end a hook 40 which hooks over a pin 42 on the synchronizer 28, to hold the synchronizer in its set or tensioned position. The other end of the lever 38 projects through an opening in the casing wall 10 to an external accessible position 41, and this end 41 may be pressed in toward the center of the shutter casing, to swing the lever 38 against the force of its spring 43, to disengage the hook 40 from the pin 42 of the synchronizer 28, allowing the synchronizer to turn clockwise on its pivot 30, under the influence of its own motor spring 32. A second pin 44 on the synchronizer 28 engages a projecting lug or shoulder 46 on the master member 12, in such manner that when the synchronizer 28 is tensioned from the position shown in Fig. 1 to the position shown in Fig. 2, the pin 44 will swing the master member 12 in a clockwise or tensioning position until the latching shoulder 22 engages with the abutment 24 to hold the master member in its tensioned position as seen in Fig. 2.

On the synchronizer 28 is a gear tooth segment indicated diagrammatically at 48, meshing with gear teeth on a gear 50 rotatably mounted on the spindle 52 fixed in the shutter casing. The gear 50 carries a cam 54 fixed to the gear, and also a ratchet wheel or escapement wheel 56, working in conjunction with a ratchet pawl or anchor member 58 oscillating on the fixed pivot 59. When the cam 54 rotates on the spindle 52, it engages one end 60 of a double arm switch lever 62, rotatably supported on the pin 64 in the shutter casing, and held by the hairpin spring 66 in the mid position illustrated. The second arm 68 of the switch lever 62 actuates the electric switch which controls the flashlight used in taking the picture.

The electric switch includes two contact elements, an elastic or spring contact arm 70 and a fixed contact member 72. These parts are electrically connected to any suitable electrical plug or connection device accessible externally of the camera casing, of known form, such as the bushing 74 projecting a short distance radially from the shutter casing 10, with the main body of the bushing 74 forming an electrical connection with the spring contact member 70, and a central pin 76 within the bushing 74 and electrically insulated therefrom, forming an electric connection with the fixed switch contact member 72. By a suitable conventional flexible cord or cable, the bushing 74 and its pin 76 are electrically connected in known manner to the so-called flashgun or other photographic flashlight apparatus with which the camera bearing this shutter is to be used.

The switch lever 62 is so related to the switch contact member 70 that when the switch lever swings a short distance in a clockwise direction on its pivot 64, from the position shown in Fig. 1, the end 68 of the switch lever will press against the spring contact 70 and move the latter into engagement with the fixed contact 72, thus closing the electric circuit of the flashlight device. If it is desired to render this switch inoperative, this may be done by swinging the externally accessible end of a control arm 78, on its pivot 79, from the full line position marked M in Fig. 1 to the dotted line position marked X, so that the other or inner end of the lever 78 engages a hub 80 on the switch lever 62 and swings the latter, against the force of its spring 66, in a counterclockwise direction on the pivot 64, so that the end 68 of the switch lever is farther away from the spring contact 70 and the end 60 of the switch lever is out of the path of movement of the cam 54. A pin 81 on the control lever 78, during this movement from M position to X position, slides past a high point or nose on the spring 83, which serves to hold the lever 78 and the lever 62 in the X position described. In this position of the parts, the electric switch 70, 72 is not operated by the switch lever 62, but may be closed by some other suitable element such as the arm 82 on the bellcrank lever 84 forming part of the shutter mechanism itself and serving to close the switch just as the shutter blades reach their fully opened position.

The positions M and X of the lever 78, indicated in Fig. 1, thus correspond to what is commonly known in the photographic art as "M synchronization" and "X synchronization," respectively. M synchronization is used with ordinary flashbulbs having a time lag of, for example, about 20 milliseconds from the time that the electric circuit is closed to the time of maximum brilliance of the flash, so that the electric switch must be closed about 20 milliseconds before the shutter blades reach their fully opened position, in order that the maximum brilliance of the flash may coincide with the maximum opening of the shutter blades. X synchronization is used with a different type of flashlamp, in which there is substantially no time lag between the closing of the electric circuit and the attainment of maximum brilliance of flash, so that with this type of flashlamp, the electric switch is not closed until the shutter blades are substantially at their fully opened position.

The operation of this first embodiment of the invention (Figs. 1 and 2) is as follows: When it is desired to make a photographic exposure with a flashbulb of the usual type having a lag of about 20 milliseconds, the control lever or reversing switch 78 is placed in the M position, which is the full line position shown in Fig. 1, and the flashbulb is connected to a source of electric power (for example, a battery, or a battery and condenser arrangement) and to the switch 70, 72 by means of a suitable electric cord and plug pushed into the bushing 74. The shutter is then moved from its rest position to its tensioned or set position (that is, from the position of Fig. 1 to the position of Fig. 2) by pressing the synchronizer lever 36 in a downward direction, to turn the synchronizer 28 in a counterclockwise direction on its pivot 30, against the force of its spring 32. During this movement of the synchronizer member 28, the pin 44 engages the part 46 of the shutter master member 12, and swings this master member in a clockwise direction on its bearing 14, thus tensioning the main motor spring 16 of the shutter. At the conclusion of the setting movement, the shoulder 22 of the latch 18 engages behind the abutment 24 on the master member, and holds the master member 12 in its set or tensioned position, and at the same time the hook 40 on the latch 38 engages behind the pin 42 of the synchronizer member 28, and holds the synchronizer member in its set or tensioned position.

During this counterclockwise setting movement of the synchronizer 28, the gear teeth 48 thereon have turned the gear 50 and cam 54 in a clockwise direction on the pivot 52. The clockwise turning of the cam 54 engages the end 60 of the switch lever 62, and swings this end 60 to the right, thus swinging the other end 68 of the lever to the left, in a manner which does not cause closing of the switch 70, 72, and thus does not cause premature firing of the flashbulb.

When the exposure is to be made, the trigger or release member 41 is pressed radially inward toward the center of the shutter. This withdraws the hook 40 from the pin 42, allowing the spring 32 of the synchronizer to move the synchronizer 38 clockwise on its pivot 30. This movement causes corresponding counterclockwise movement of the gear 50 and cam 54. Early in the course of this movement, the cam 54 engages the end 60 of the switch lever 62, and swings this arm 60 to the left, thus causing the other end 68 of the switch lever to move rightward into contact with the flexible switch arm 70, pressing the latter against the fixed contact 72, to close the electric switch and initiate the firing of the flashbulb. But during this movement, it will be seen that the force of the main shutter spring 16 is still fully resisted by the latch 18, and does not create any frictional drag whatever on the movement of the synchronizer 28, until near the end of the stroke of the synchronizer.

After the switch 70, 72 is closed, the synchronizer 28 continues to move in a clockwise direction, for some further distance, until finally, near the very end of the movement of the synchronizer, the pin 44 strikes the latch 18 and moves this latch on its pivot 20, to release the shoulder 22 from the abutment 24 on the master member, thus permitting the main spring 16 of the master member to rotate the latter in a counterclockwise direction on the lens tube 14. This counterclockwise rotation of the master member 12, in the usual known manner, causes an opening movement and then a closing movement of the shutter blades 26, this movement of the shutter blades being accompanied by first a counterclockwise turning and then a clockwise turning of the bellcrank 84 which is, indeed, part of the mechanism which drives the shutter blades from the master member 12.

During this turning of the synchronizing member 28, the engagement of the anchor or escapement member 58 with the escapement teeth 56 serves to slow down the turning of the cam 54 and gear 50, to delay the movement of the parts enough to produce the desired time lag of 20 milliseconds from the time of closing the switch 70, 72 to the time of maximum opening of the shutter blades 26. During most of the movement of the synchronizer 28, until almost the very end of its movement, this movement is entirely independent of the force of the main motor spring 16, and the friction between the latch parts 22 and 24 does not in any way impede or affect the turning of the synchronizer 28; consequently the friction of these latch parts does not cause any irregularity or unreliability in most of the movement of the synchronizer. It is only at the last stage of the movement of the synchronizer, and then only for a very brief interval, that the pin 44 on the synchronizer engages the latch member 18, and slides the latch shoulder 22 across the surface of the abutment 24. Thus it is only during this very small part of the synchronizer movement, that the friction between the parts 22 and 24 can affect the synchronizer in any way, and this part of the movement of the synchronizer is so small in comparison to the entire movement thereof, that a very reliable and uniform action of the synchronizer is assured.

If the exposure is to be made with a flashlamp of the X type having substantially no lag from the time of closing the circuit to the time of maximum brilliance, then the control lever 78 is shifted from the M position shown in full lines in Fig. 1, to the X position shown in dotted lines in the same figure. This movement, as above explained, swings the switch lever 62 in a counterclockwise direction on its pivot 64, so that the tail 60 is no longer in the path of travel of the cam 54 and is not influenced thereby, even though the cam moves in its usual way. The closing of the circuit then takes place through the action of the bellcrank lever 84, which turns counterclockwise during the opening of the shutter blades and clockwise during the closing of the blades. Just as the blades reach their fully open position, the counterclockwise swinging movement of the bellcrank 84 reaches a position in which the pin 82 presses the flexible switch arm 70 against the switch member 72, to close the circuit. The circuit is closed in this manner at each actuation of the shutter, regardless of whether the synchronizer is set for M or X. But when the shutter is set for M synchronization, the closing of the switch by means of the lever 62 occurs before the closing thereof by the bellcrank 84, so that the second closing of the switch by the bellcrank 84 is of no consequence or effect.

In this first embodiment of the invention, illustrated in Figs. 1 and 2, the external setting lever 36 constitutes an integral part of the synchronizer 28, and so swings back from its set position to its rest position, when the synchronizer operates during the making of an exposure. In Fig. 3 there is shown an alternative construction in which the setting lever is separate from the synchronizer and, after setting is accomplished, moves immediately back to its rest position, no further movement of the setting lever taking place during the actual exposure. The synchronizer 28, in this construction shown in Fig. 3, has a nose 28a engaged by a lug 36b on the setting lever 36a which swings on the same pivot 30 with the synchronizer 28. A spring 36c tends to turn the setting lever 36a in a clockwise direction and to hold it against the stop pin 34. The other parts of the construction are the same as the previous construction shown in Figs. 1 and 2, and are indicated by the same reference numerals. To set the shutter, the arm 36a is moved downwardly, in a counterclockwise direction about the pivot 30, and the ear 36b engaging the nose 28a causes a corresponding counterclockwise turning of the synchronizer 28, to set the synchronizer and the master member 12, just as in the previous case. But after the master member has become latched by its latch 18 and the synchronizer has become latched by its latch 38, the release of finger pressure on the setting lever 36a allows the spring 36c to turn this setting lever back in a clockwise direction to its normal rest position, against the pin 34. Then when the shutter is tripped or released to make an exposure, the synchronizer 28 turns as in the previous embodiment, but at this time it causes no movement of the external arm 36a.

Another alternative construction is illustrated in Fig. 4, where the parts are substantially the same except that here the synchronizer 128 is slidable along an arcuate path within the shutter casing, guided by two pins 130, instead of being rotatable on a single pin. In this way, a longer setting stroke of the synchronizer can be attained. The synchronizer 128 has an arm 136 projecting outwardly to an accessible position externally of the shutter casing 110, and when this arm is moved upwardly, it moves the synchronizer 128 against the force of its spring 132, while at the same time the gear teeth 148 on the synchronizer cause rotation of the gear 150, which corresponds to the gear 50 in the previous embodiment, which gear carries the cam for contacting the switch arm, the same as before, the cam and switch arm being not further illustrated.

The latch 118 has a latching shoulder 122 for engaging the abutment 124 on the maser member 112 which, as before, turns on the lens tube 114, and serves to open and close the shutter blades 126 during the counterclockwise return movement of the master member, under the influence of its main power spring 116. The lug 144 on the synchronizer 128 engages the projection 146 on the master member during the setting movement of the synchronizer, to set or tension the master member. When the master member is fully tensioned, the latch 118 holds it in tensioned position, while the end 140 of the latch 138 engages the part 142 on the synchronizer to hold it in its tensioned position until the trip member or trigger 141 is pressed, to release the synchronizer.

When the synchronizer is released, it moves back toward its rest position under the influence of its own spring 132, without being affected by the friction between the parts 122 and 124, until near the end of the return movement, at which time the part 142 on the synchronizer engages an inclined cam surface on the latch 118 and releases this latch from the master member, to permit the latter to turn to open and close the shutter blades. The early part of the return movement of the synchronizer 128 has meanwhile turned the gear 150 so that the flashlight circuit switch has been closed, just as in the case of the first embodiment. The parts shown in Fig. 4 bear, in general, the same reference numerals used for corresponding parts in Figs. 1 and 2, with the addition of 100 to each numeral, so that the casing 10 in Fig. 1 becomes 110 in Fig. 4, the shutter blades 26 become the blades 126, etc.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter having a casing containing a source of power and a master member effective upon movement in a first direction to tension said source of power and effective upon reverse movement in a second direction to open and close the shutter to make an exposure, a first latch for releasably holding said master member in tensioned position at the end of its movement in said first direction, an electric switch within said casing, a second source of power within said casing independent of the first mentioned source of power, a synchronizer element within said casing effective upon movement in a first direction to tension said second source of power and effective upon reverse movement in a second direction to close said electric switch and thereafter to make contact with and release said first latch near the end of its movement in its second direction, said first latch being out of contact with said synchronizer element and being free of frictional effect upon said synchronizer element during the major part of said reverse movement of said synchronizer element, means operatively connected to said synchronizer element to move said master member in its first direction when said synchronizer element is moved in its first direction, a second latch for releasably holding said synchronizer element in tensioned position at the end of its movement in its first direction, and manually operable means accessible exteriorly of said casing for releasing said second latch.

2. A photographic shutter including a casing, a master member movable in one direction through a tensioning movement and in a reverse direction through a shutter actuating movement, a first latch for holding said master member in tensioned position, an electric switch, a synchronizer element movable in one direction through a tensioning movement and in a reverse direction through a switch closing movement, manually operable means for moving said synchronizer element through its tensioning movement, a second latch for holding said synchronizer element in its tensioned position, manually operable means for releasing said second latch so that said synchronizer element may move in its reverse movement, and means associated with said synchronizer element for moving said master member through its tensioning movement by the movement of said synchronizer element through its tensioning movement and for making contact with and releasing said first latch by the reverse movement of said synchronizer element and during only the latter part thereof, so that said master member may then make its reverse movement, said synchronizer element being out of contact with said first latch during the major part of its said reverse movement.

3. A construction as defined in claim 1, in which said synchronizer element has a projecting part, and in which said second latch comprises a spring pressed pawl engaging behind said projecting part to hold said synchronizer element in tensioned position.

4. A construction as defined in claim 3, in which said pawl is in the form of a double-armed lever, one arm of which engages said projecting part of said synchronizer element, and the other arm of which projects to an accessible position outside of said casing for manual actuation to release said second latch.

5. A construction as defined in claim 1, in which said synchronizer element carries a pin engaging directly with said master member to move said master member in its said first direction when said synchronizer element moves in its first direction.

6. A construction as defined in claim 5, in which said pin which engages said master member during said movement in the first direction serves also to engage said first latch to release it during movement of said synchronizer element in its second direction.

7. A construction as defined in claim 1, in which said synchronizer element has gear teeth, and further including a rotary gear meshing with and driven by the gear teeth of said synchronizer element, and means driven by said rotary gear for closing said electric switch.

8. A construction as defined in claim 7, further including escapement mechanism associated with said rotary gear for delaying the speed of rotation thereof.

9. A construction as defined in claim 7, in which said switch includes a flexible switch contact movable into engagement with a fixed contact, a lever for moving said flexible contact, and a cam driven by said rotary gear for moving said lever.

10. A construction as defined in claim 1, in which said synchronizer element has a manually operable arm accessible exteriorly of said casing for moving said synchronizer element in its first direction.

11. A construction as defined in claim 1, in which said synchronizer element being moved in its first direction by means of a manually operable lever rotatably mounted in and projecting from said casing and engaging said synchronizer member, and further including spring means engaging and moving said lever in its rest position.

References Cited in the file of this patent

UNITED STATES PATENTS

| | | |
|---|---|---|
| 2,502,668 | Pirwitz | Apr. 4, 1950 |
| 2,514,919 | Willcox | July 11, 1950 |
| 2,541,895 | Thunberg | Feb. 13, 1951 |
| 2,563,782 | Fuerst | Aug. 7, 1951 |